T. W. VARLEY.
ELECTRIC PYROMETER.
APPLICATION FILED JAN. 15, 1918.

1,375,872.

Patented Apr. 26, 1921.

Thomas W. Varley
INVENTOR

BY Thomas Howe
ATTORNEY

UNITED STATES PATENT OFFICE.

THOMAS W. VARLEY, OF NEW YORK, N. Y.

ELECTRIC PYROMETER.

1,375,872.  Specification of Letters Patent.  Patented Apr. 26, 1921.

Application filed January 15, 1918. Serial No. 211,959.

*To all whom it may concern:*

Be it known that I, THOMAS W. VARLEY, a citizen of the United States, residing at city, county and State of New York, have invented new and useful Improvements in Electric Pyrometers, of which the following is a specification.

This invention relates to means for indicating or measuring variable potentials which involve the balancing of a known or indicated drop of potential against the potential to be measured and which is for use in connection with pyrometer systems wherein a thermo couple is exposed to the temperature to be measured, the electromotive force thereby generated in the couple being a measure of the temperature and indications being produced by balancing methods as before referred to. The invention also may be applied to other uses which do not involve pyrometer or thermo couples.

The main object of the invention is to provide an improved means of the character indicated for measuring variable potentials.

A further object of the invention is to provide an improved pyrometer system; and other and ancillary objects of the invention will appear hereinafter.

In the accompanying drawings which illustrate the invention, Figure 1 is a diagram showing the connections and arrangement of the apparatus of a pyrometer system embodying the invention.

Figure 1:
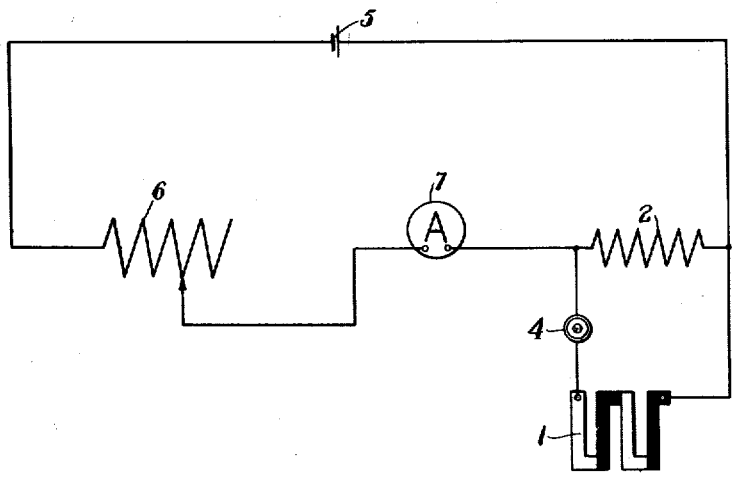

Referring to the drawings, and first to Fig. 1, a thermo couple 1, is suitably mounted in a furnace or other location where the temperature is desired to be measured. This thermo couple is connected in a shunt to a resistance 2, the opening and closing of the shunt being controlled by a push button 4. A suitable source of current such as a battery 5 has one terminal connected through a variable resistance 6 and a current responsive instrument 7, such as an ammeter with the junction of the circuit branches containing the resistance 2 and the thermo couple. The other junction of these branches is connected to the terminal of the other source 5. It will be observed that the ammeter 7 carries the current through the branch containing the thermo couple and also through the resistance 2. A change of current through either of these branches will therefore affect the total amount of current passing through the ammeter 7 and therefore affect its indication. The resistance 2 being fixed, the drop of potential across it will be proportional to the current flowing in it. This current can be made any that is desired by varying the resistance 6. If, at any time, the electromotive force of the thermo couple 1 is equal to the drop of potential across the branch containing the resistance 2 and it being understood that the thermo couple is so connected that its potential will be opposed to that of the source 5, then no current will tend to flow through the thermo couple, because its electromotive force will be balanced against the drop in the branch containing the resistance 2. At such a time, the opening or closing of the push button 4 will cause no change in the current through the ammeter 7, so that its needle will not be affected by such opening or closing. At such time, therefore, the voltage drop across the resistance 2 will be equal to the electromotive force of the thermo couple, which is the measure of the temperature, but when no current is flowing in the branch containing the thermo couple, the current in the ammeter 7 is proportional to the drop across the branch containing the resistance 2, consequently under such conditions, the reading of the ammeter 7 is a measure of the temperature and the ammeter may be calibrated to read in temperature instead of amperes.

In the practical operation of the apparatus therefore, the resistance 6 is varied and the push button 4 is opened and closed from time to time. When the adjustment of the resistance 6 is such that opening or closing of the push button 4 has no effect upon its indication, the condition of no current in the branch containing the thermo couple exists. The then reading of the instrument 7, is a measure of the temperature and as before stated, this may be made to read directly in temperature.

Figure 2:
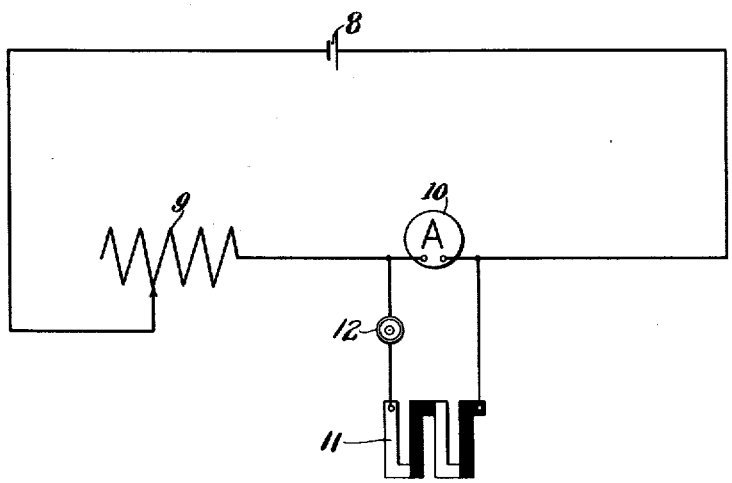
Fig. 2 is a similar view of a modified system, and—

Referring now to Fig. 2, the apparatus therein shown combines the resistance across which the thermo couple is shunted with the indicating instrument. Referring specifically to that figure, the battery or other source of electromotive force 8 has connected in series with it the variable resistance 9 and the current responsive indicating instrument 10. The instrument 10 includes a sufficient resistance to take the place of the resistance 2 of Fig. 1 and, like the resistance 2, preferably has a zero temperature coefficient so that its resistance will remain unchanged with variations in temperature from any cause. Connected in shunt to the instrument 10 is a thermo couple 11, the opening of the shunt being controlled by a push button 12. The practical operation of this apparatus is similar to that of the apparatus of Fig. 1. When the drop through the branch containing the instrument 10 is equal to the electromotive force of the thermo couple, there will be no current flowing between the two branches and consequently the opening and closing of the shunt by the push button 12 will have no effect upon the reading of the instrument. If, however, the voltage drop in the branch containing the instrument 10 and the electromotive force of the thermo couple are unequal, a closing or opening of the push button 12 will cause a variation of the current flowing in the instrument 10 and a consequent movement of its needle. The operation of the apparatus therefore, like that of Fig. 1, is to vary the resistance 9 until opening and closing of the push button 12 will have no effect on the reading of the instrument 10. At such time the reading of the instrument will be a measure of the electromotive force of the thermo couple and therefore of the temperature to be measured.

Figure 3:
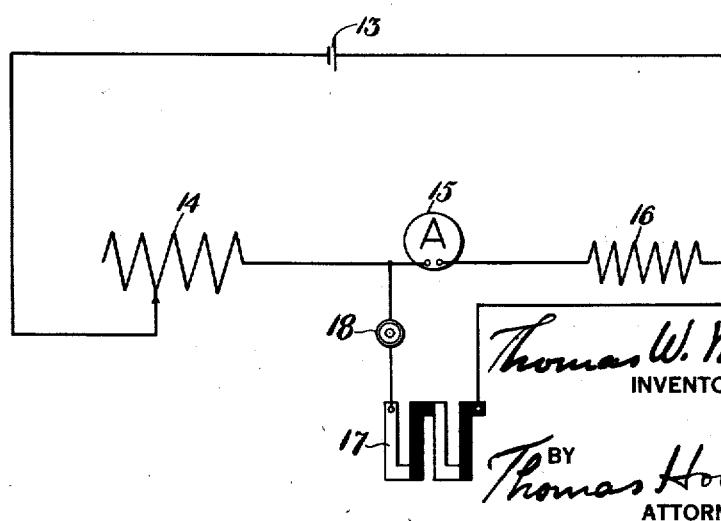
Fig. 3 is a similar view of another modification.

Referring now to Fig. 3, the indicating instrument is shown as being within the shunt containing the thermo couple, but a supplementary resistance is provided so that this supplementary resistance together with that of the instrument provides the desired resistance in shunt with the thermo couple. Thus, referring to Fig. 3 in detail, a source 13 of electromotive force has connected in series with it a variable resistance 14, a current responsive instrument 15 and a resistance 16. In multiple with the instrument 15 and the resistance 16 is connected the branch containing the thermo couple 17 which may be opened or closed by a push button 18. The operation of this apparatus is the same as that described in connection with Fig. 2 and, as before stated, the only difference is that instead of having all the resistance of the branch in shunt with the thermo couple included in the instrument, only a portion of this resistance is so included and the remainder is included in the supplementary resistance.

While the invention has been illustrated in what are considered its best applications, these do not exhaust the embodiments of the invention which are not, therefore, limited to the structures shown in the drawings.

What I claim is—

1. The combination with a source of electromotive force of a resistance, a variable resistance and a current responsive indicating instrument connected in series with said source, a shunt to said first mentioned resistance including a thermo couple and means for opening and closing said shunt without affecting the series connection of said resistances and instrument.

2. The combination with a source of electromotive force of a circuit therefor including two parallel branches, one branch comprising a thermo couple and the other branch including a device of variable voltage drop, means for opening and closing the branch including said thermo couple, means for varying the voltage drop of said device and an indicator responsive to the current in the branch containing said thermo couple, the relative connections of said indicator and said device being unaffected by the operation of said opening and closing means.

3. The combination with a source of electromotive force of a resistance, a variable resistance and a current responsive indicating instrument connected in series with said source, a shunt to said first mentioned resistance including a source of variable thermo electromoive force and means for opening and closing said shunt without affecting the series connection of said resistance and instrument, said instrument being calibrated to read in temperature.

In testimony whereof I have signed this specification this 9th day of January 1918.

THOMAS W. VARLEY.